United States Patent
Sugimoto

(10) Patent No.: US 7,298,522 B2
(45) Date of Patent: Nov. 20, 2007

(54) PRINT CONTROL SYSTEM AND MEDIUM

(75) Inventor: Moriaki Sugimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 801 days.

(21) Appl. No.: 10/102,673

(22) Filed: Mar. 22, 2002

(65) Prior Publication Data

US 2003/0043392 A1    Mar. 6, 2003

(30) Foreign Application Priority Data

Aug. 30, 2001   (JP)   ............................. 2001-262130

(51) Int. Cl.
 *G06K 15/00*   (2006.01)
(52) U.S. Cl. ...................... 358/1.3; 358/502; 358/1.16; 347/1.3
(58) Field of Classification Search ................. 358/1.8, 358/1.9, 3.07, 3.23, 1.18, 1.13, 519, 520, 358/1.3, 3.06, 3.3, 502, 1.16; 399/27, 28; 347/137, 6, 7, 115, 131, 1.3
See application file for complete search history.

(56) References Cited

U.S. PATENT DOCUMENTS

| | | | | |
|---|---|---|---|---|
| 5,111,044 A | * | 5/1992 | Agano | ........................ 250/584 |
| 5,668,635 A | * | 9/1997 | Tomida et al. | ............... 358/296 |
| 5,767,978 A | * | 6/1998 | Revankar et al. | ............ 358/296 |
| 5,862,306 A | * | 1/1999 | Torikai et al. | ................ 358/1.9 |
| 6,313,925 B1 | * | 11/2001 | Decker et al. | ................ 358/1.9 |
| 6,421,141 B2 | * | 7/2002 | Nishikawa | ................... 358/1.9 |
| 6,804,025 B1 | * | 10/2004 | Nishihara et al. | ............. 358/1.9 |

FOREIGN PATENT DOCUMENTS

| | | |
|---|---|---|
| JP | 11-151833 | 6/1999 |
| JP | 2000-132006 | * 12/2000 |

* cited by examiner

*Primary Examiner*—Jerome Grant, II
(74) *Attorney, Agent, or Firm*—Kratz, Quintos & Hanson, LLP

(57) ABSTRACT

A print control system for controlling a print of print target data containing color specifying information includes a data distinguishing module (12) for distinguishing between pieces of element data contained in the print target data, and a color adjusting module (13, 14, 15, 16, 17) for adjusting a mix of color materials based on the color specifying information according to a category of the element data.

18 Claims, 16 Drawing Sheets

FIG. 5

| CHARACTER /GRAPHIC /IMAGE CATEGORIES | TONER SAVE LEVEL | DRAW ATTRIBUTE CATEGORY | PRINT RESOLUTION | LOOKUP TABLE |
|---|---|---|---|---|
| CHARACTER | LARGE | LARGE (OVER 10 POINTS) | HIGH IMAGE QUALITY | 63 |
| | | | STANDARD | 62 |
| | | | LOW IMAGE QUALITY | 61 |
| | | MEDIUM (OVER 5 POINTS BUT SMALLER THAN 10 POINTS) | HIGH IMAGE QUALITY | 54 |
| | | | STANDARD | 53 |
| | | | LOW IMAGE QUALITY | 52 |
| | | SMALL (SMALLER THAN 5 POINTS) | HIGH IMAGE QUALITY | 45 |
| | | | STANDARD | 44 |
| | | | LOW IMAGE QUALITY | 43 |
| | MEDIUM | ⋮ | ⋮ | ⋮ |
| | SMALL | ⋮ | ⋮ | ⋮ |
| GRAPHIC | LARGE | FINE (SMALLER THAN 1 POINT) | HIGH IMAGE QUALITY | 60 |
| | | | STANDARD | 59 |
| | | | LOW IMAGE QUALITY | 58 |
| | | MEDIUM (OVER 1 POINT BUT SMALLER THAN 2 POINTS) | HIGH IMAGE QUALITY | 51 |
| | | | STANDARD | 50 |
| | | | LOW IMAGE QUALITY | 49 |
| | | BOLD (OVER 2 POINTS) | HIGH IMAGE QUALITY | 42 |
| | | | STANDARD | 41 |
| | | | LOW IMAGE QUALITY | 40 |
| | MEDIUM | ⋮ | ⋮ | ⋮ |
| | SMALL | ⋮ | ⋮ | ⋮ |
| IMAGE | LARGE | — | HIGH IMAGE QUALITY | 57 |
| | | — | STANDARD | 56 |
| | | — | LOW IMAGE QUALITY | 55 |
| | MEDIUM | ⋮ | ⋮ | ⋮ |
| | SMALL | ⋮ | ⋮ | ⋮ |

*FIG.10*

TONER SAVE LEVEL: LARGE

| R1 | G1 | B1 | R2 | G2 | B2 |
|---|---|---|---|---|---|
| 0 | 0 | 0 | 0 | 0 | 0 |
| 7 | 0 | 0 | 0 | 0 | 0 |
| : | : | : | : | : | : |
| 128 | 0 | 0 | 126 | 0 | 0 |
| : | : | : | : | : | : |
| 255 | 255 | 255 | 254 | 254 | 254 |

*FIG.11*

CHARACTER SIZE: LARGE

SMALL  MEDIUM  LARGE

| R1 | G1 | B1 | R2 | G2 | B2 |
|---|---|---|---|---|---|
| 0 | 0 | 0 | 0 | 0 | 0 |
| 7 | 0 | 0 | 0 | 0 | 0 |
| : | : | : | : | : | : |
| 128 | 0 | 0 | 126 | 0 | 0 |
| : | : | : | : | : | : |
| 255 | 255 | 255 | 254 | 254 | 254 |

*FIG.12*

LINE WIDTH: BOLD

FINE / MEDIUM / BOLD

| R1 | G1 | B1 | R2 | G2 | B2 |
|----|----|----|----|----|----|
| 0 | 0 | 0 | 0 | 0 | 0 |
| 7 | 0 | 0 | 0 | 0 | 0 |
| : | : | : | : | : | : |
| 128 | 0 | 0 | 126 | 0 | 0 |
| : | : | : | : | : | : |
| 255 | 255 | 255 | 254 | 254 | 254 |

PRINT CONTROL SYSTEM AND MEDIUM

BACKGROUND OF THE INVENTION

The present invention relates to a printing technology.

With sophisticated information processing technologies, a multiplicity of information devices are used in a variety of scenes in the society. Then, an enormous quantity of information is printed by printers. Particularly over the recent years, images captured by digital cameras etc are printed by color printers in the great majority of cases. The color print involves especially a large quantity of toner consumption.

Accordingly, a running cost that depends upon the toner consumption is not ignorable nowadays. This being the case, a scheme for saving the toners has hitherto been proposed.

What is known as a toner save technology for this purpose is a method of extracting an outline of character/graphic data after being developed on, e.g., a bitmap memory. This method serves to restrain a quantity of toners by diminishing a dot size of an internal area or the outline of the character/graphic data (which may be called a prior art 1).

Another known method is that the toner quantity is restrained by thinning out at a fixed ratio the data after similarly being developed on the bitmap memory (wherein the dots occupying a fixed ratio per unit area are removed off) (which may be called a prior art 2). Alternative known method is that the toner quantity is restrained by increasing at a fixed ratio the brightness of the print data as a whole (which may be called a prior art 3).

These prior arts, however, have no scheme of distinguishing between categories of the print data such as characters, graphic, images etc, and the toner save is carried out by the same method with respect to all pieces of print data. Therefore, the toner save optimal to every category of the print data was not actualized. Then, as a result, the toner save function described above proved poor of a print quality and was therefore unusable except at a print level for trial.

The prior art 1 is effective in, for example, the characters and graphics with no expression of halftones (intermediate colors), but raises a problem of being unable to functioning effectively in the characters and graphics involving the expressions of images and halftones. This is because it is difficult to extract the outline of the character and graphic containing the halftone expression.

Particularly in the case of the color print, the processing is effected for four colors Y (yellow), M (magenta), C (cyan) and K (black), and hence the halftone expression is indispensable for the character and graphic. The prior art 1 was not therefore applicable to the color print.

Further, the prior art 2 also has problems in a pattern having a periodicity in the print data and in a dot pattern. Namely, in the case of thinning out the above print data at the fixed ratio, an irregularity in period due to interference with the pattern period becomes conspicuous, which did not lead to a preferable result of printing.

Moreover, the prior art 3 has a possibility in which sharpness (clearness) conceived important in terms of an image quality might be deteriorated because of increasing the brightness of the character/graphic/image as a whole. Further, when applied to a small character and a fine line, a solid line might be printed as if a dotted line and might appear lighter than a brightness improving rate specified.

Further, there has seen a leap in improvements of the quality and performance of a color printer over the recent years, and a printed result having substantially the same quality as a photograph has been acquired. There is provided a product capable of outputting such a high-quality print at the same printing speed as that of a monochromatic printer (that outputs a binary monochrome pattern and will hereinafter be simply termed a monochrome printer or a monochrome machine).

Furthermore, a product price rapidly decreases, and there is a possibility wherein the market shares of the monochrome printers and color printers will be reversed several years later. For attaining this share-turnabout, a print cost per page is a bottleneck.

A cost for using the toners for a color print is higher than a cost for a monochrome print. Then, if print target data are categorized as a material for presentation that contains natural images and background colors, a print area increases. Therefore, the print of such data involves a further increase in toner spent quantity.

On the other hand, if a large quantity of prints can be attained owing to a decrease in price of the main unit of the printer product, there might be a strict request for a running cost in terms of purchasing the printer product.

SUMMARY OF THE INVENTION

It is a primary object of the present invention, which was devised to obviate the problems inherent in the prior arts described above, to efficiently reduce a spent quantity of color materials such as toners in a way that restrains a decline of print quality.

To accomplish the above object, according to one aspect of the present invention, a print control system for controlling a print of print target data containing color specifying information, comprises a data distinguishing module (12) distinguishing between pieces of element data contained in the print target data, and a color adjusting module (13, 14, 15, 16, 17) adjusting a mix of color materials on the basis of the color specifying information according to a category of the element data.

Preferably, the print control system may further comprise a converting module (19-1 through 19-N) converting the color specifying information into mix specifying information for specifying a mix of the color material, and the color adjusting module (13, 14, 15, 16, 17) may adjust the mix specifying information according to the category of the element data.

Preferably, the print control system may further comprise an information input module inputting save specifying information for saving the color materials when printing according to the category of the element data, and the color adjusting module (13, 14, 15, 16, 17) may save the color materials when printing by adjusting the mix specifying information based on the save specifying information according to the category of the element data.

Preferably, the print control system may further comprise a categorizing module (16) categorizing the element data on the basis of dimension attributes, and the color adjusting module (13, 14, 15, 16, 17) may adjust the mix specifying information in accordance with the dimension attributes.

Preferably, the print control system may further comprise an information input module inputting information on resolutions used when printing, and the color adjusting module (13, 14, 15, 16, 17) may adjust the mix specifying information in accordance with the resolutions used when printing.

According to another aspect of the present invention, a print control system for controlling a print of print target data containing color specifying information comprises an information input module inputting information on a difference from a coloring value based on the color specifying information, and a color adjusting module (13, 14, 15, 16, 17) adjusting a mix of color materials on the basis of the color specifying information within a range of the difference, and minimizing a consuming quantity of the color materials. The color adjusting module (13, 14, 15, 16, 17) may adjust the mix of the color materials in such a direction as to reduce a consuming quantity of the color material.

Preferably, the print control system may further comprise a converting module (19-1 through 19-N) converting the color specifying information into mix specifying information for specifying a mix of the color material.

According to a further aspect of the present invention, a print control method of controlling a print of print target data containing color specifying information comprises distinguishing between pieces of element data contained in the print target data (S1), and color adjustment adjusting a mix of color materials on the basis of the color specifying information according to a category of the element data (S3, S5, S6).

As described above, according to the present invention, the color materials (for an example, toner) save function usable not for a mere print for trial but for a utilizable operation can be provided by adjusting the mix of the color materials individually corresponding to the print data and the draw attributes.

Further, the present invention schemes to minimize the consuming quantity of the color materials within the range of the difference between the coloring values inputted, and is therefore capable of saving the color materials within the range utilizable and usable to the user.

As discussed above, according to the present invention, the spent quantity of the color materials such as toners etc can be efficiently reduced in a way that restrains a decline of a print quality.

BRIEF DESCRIPTION OF THE DRAWINGS

FIG. 5 is a diagram showing a structure of a selection table for selecting the lookup table;

FIG. 10 is a diagram showing a data structure of a lookup table for the color conversion based on the toner save levels in a second embodiment;

FIG. 11 is a diagram showing a lookup table for a character-attribute-based color conversion;

FIG. 12 is a diagram showing a data structure of a lookup table for a graphic-attribute-based color conversion;

DETAILED DESCRIPTION OF THE PREFERRED EMBODIMENTS

Preferred embodiments of the present invention will hereinafter be described with reference to the accompanying drawings.

First Embodiment

A printing system in a first embodiment of the present invention will hereinafter be discussed with reference to FIGS. 1 through 9. According to the first embodiment, the printing system for providing a toner save function when printing will be explained.

Figure 1:
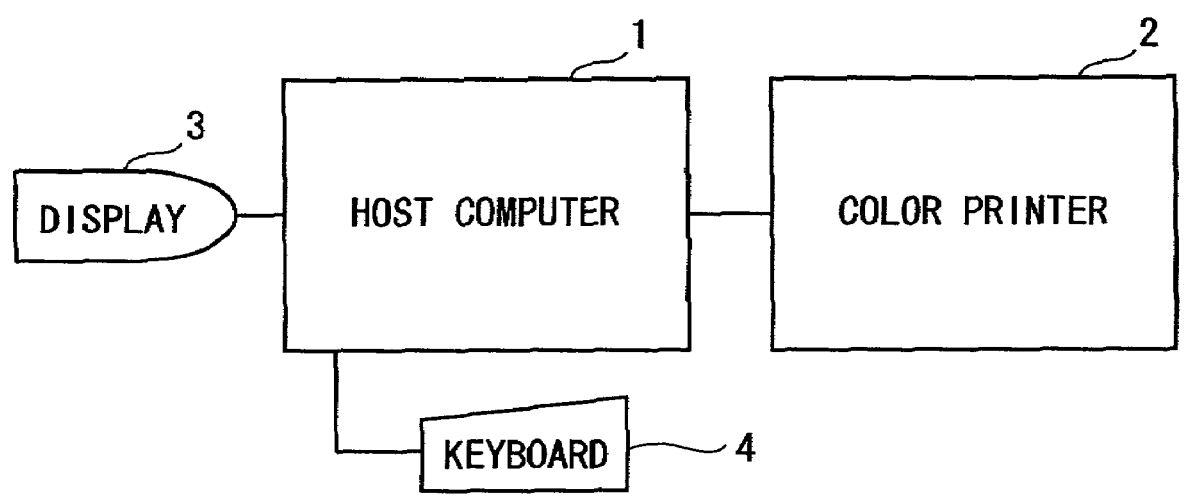
FIG. 1 is a diagram showing a system architecture of a printing system in a first embodiment of the present invention.
Figure 2:
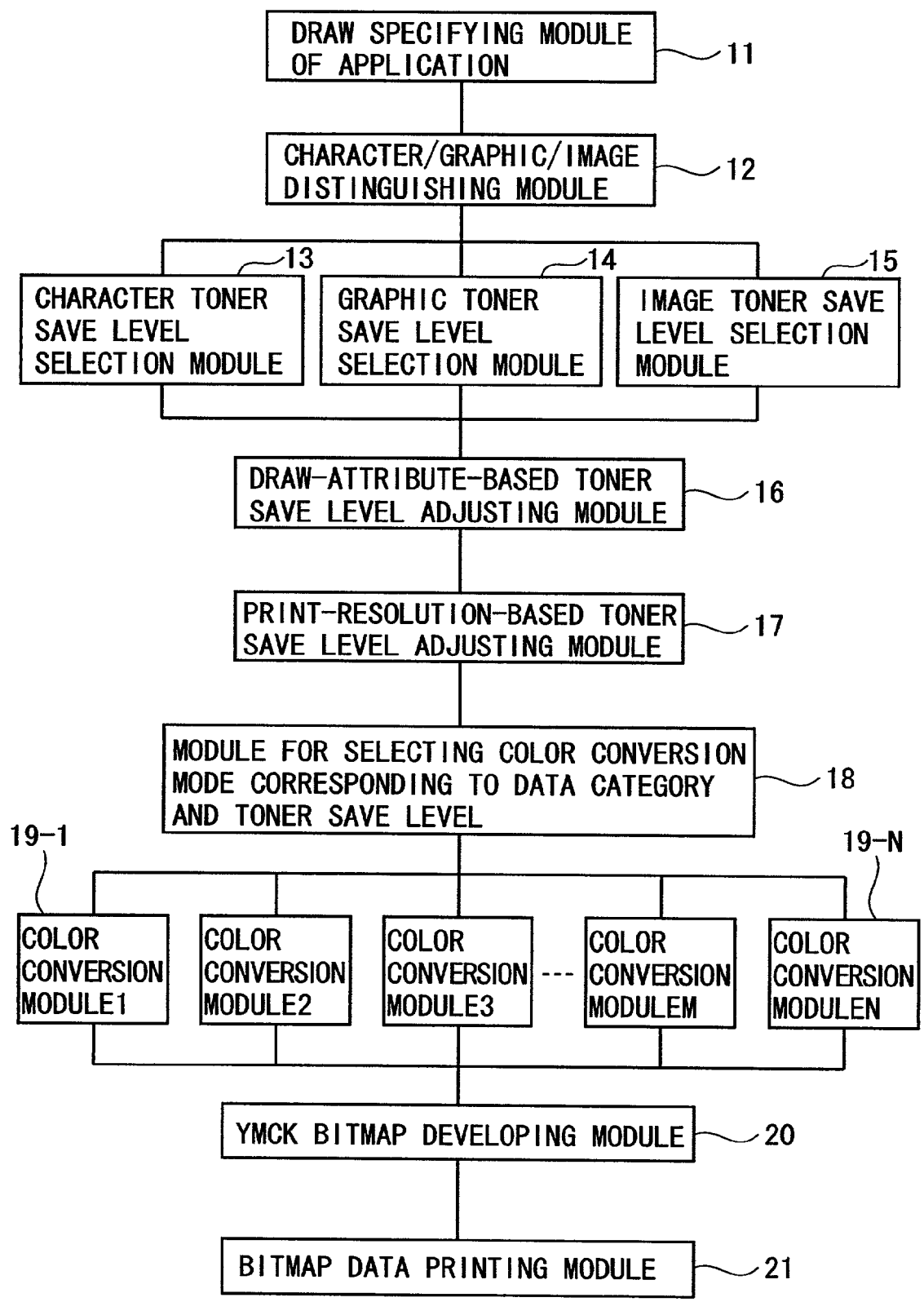
FIG. 2 is a diagram showing an architecture of functions of the printing system.
Figure 3:
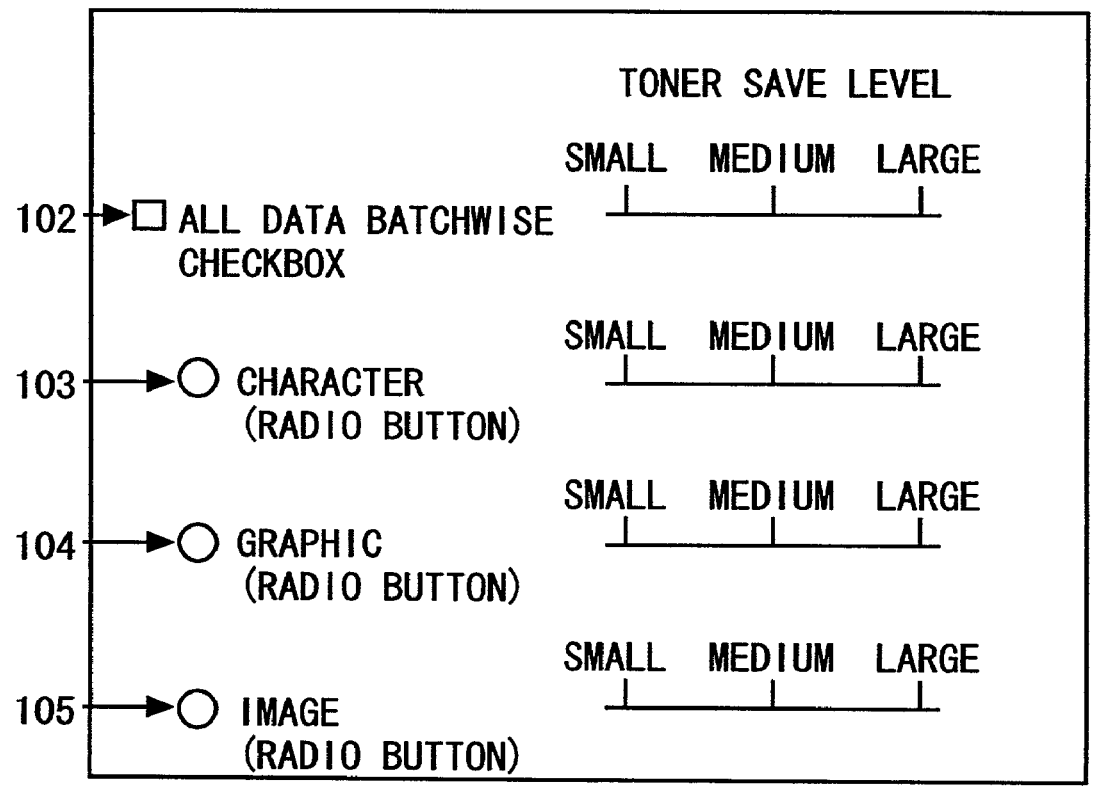
FIG. 3 is a diagram showing an example of a menu screen.
Figure 4:
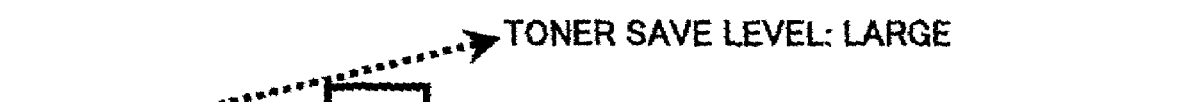
FIG. 4 is a diagram showing an example of one of lookup tables for color conversions based on toner save levels.
Figure 6:
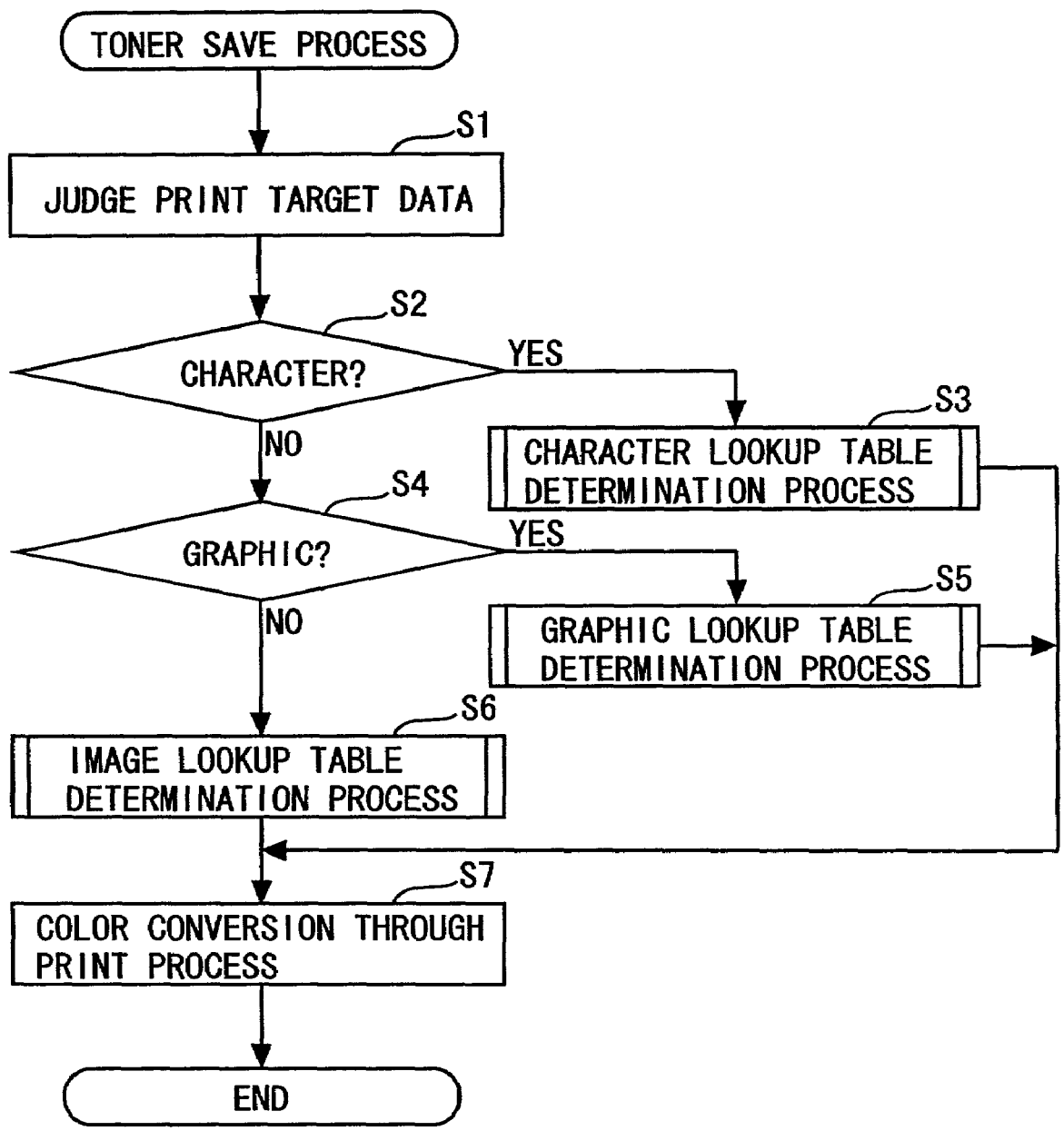
FIG. 6 is a flowchart showing a toner save process in the first embodiment.
Figure 7:
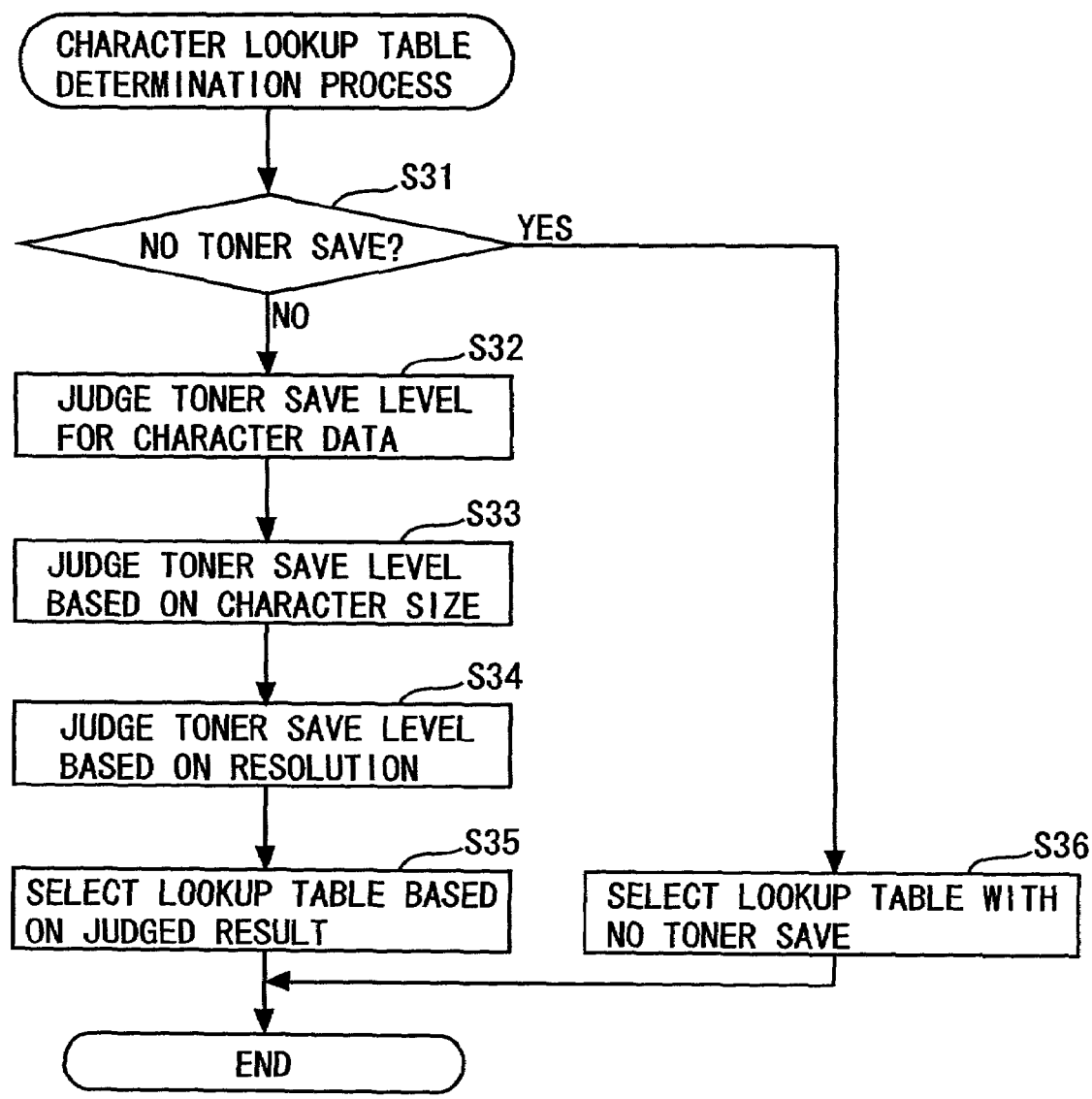
FIG. 7 is a flowchart showing details of a lookup table determination process for characters.
Figure 8:
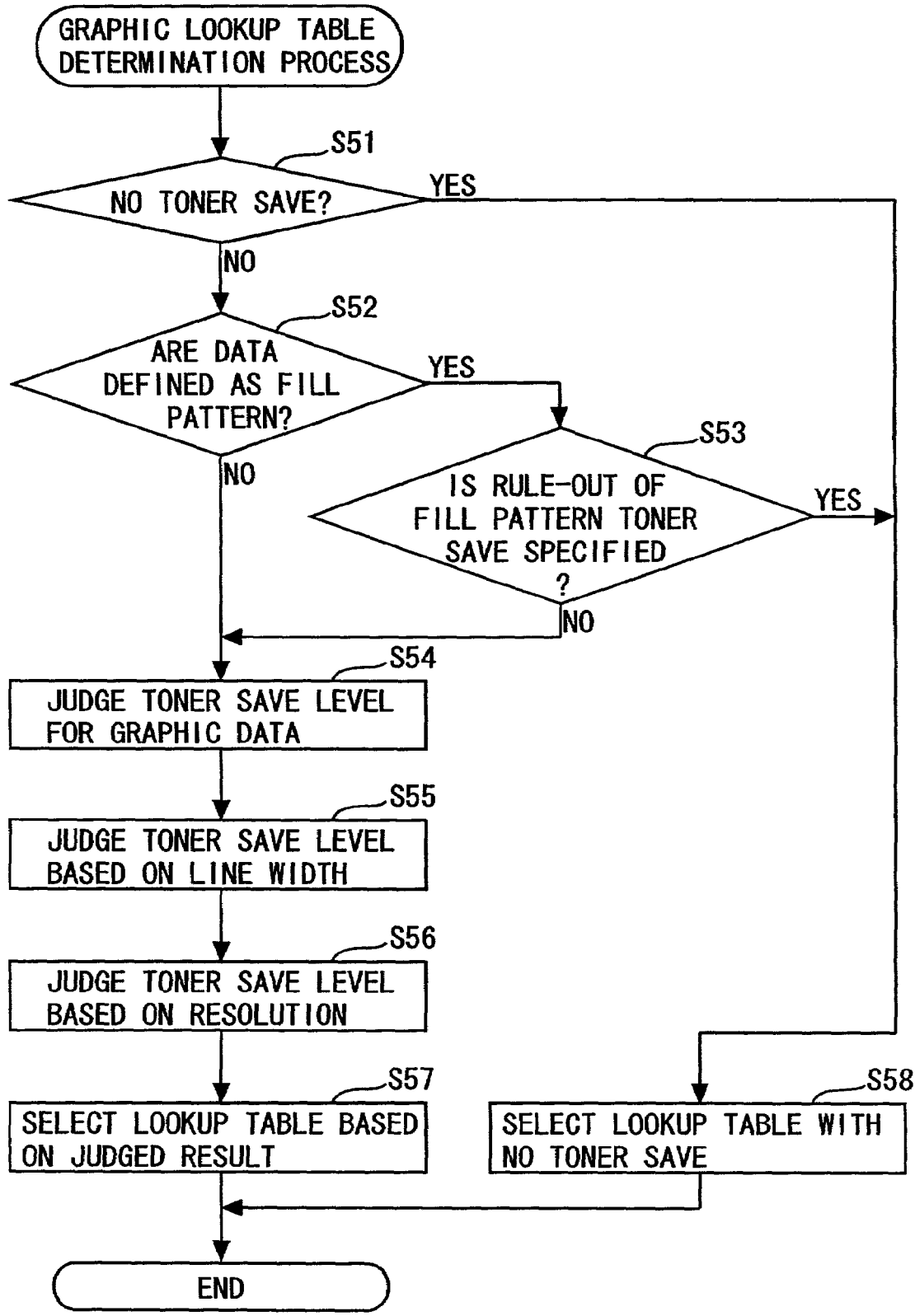
FIG. 8 is a flowchart showing details of a lookup table determination process for graphics.
Figure 9:
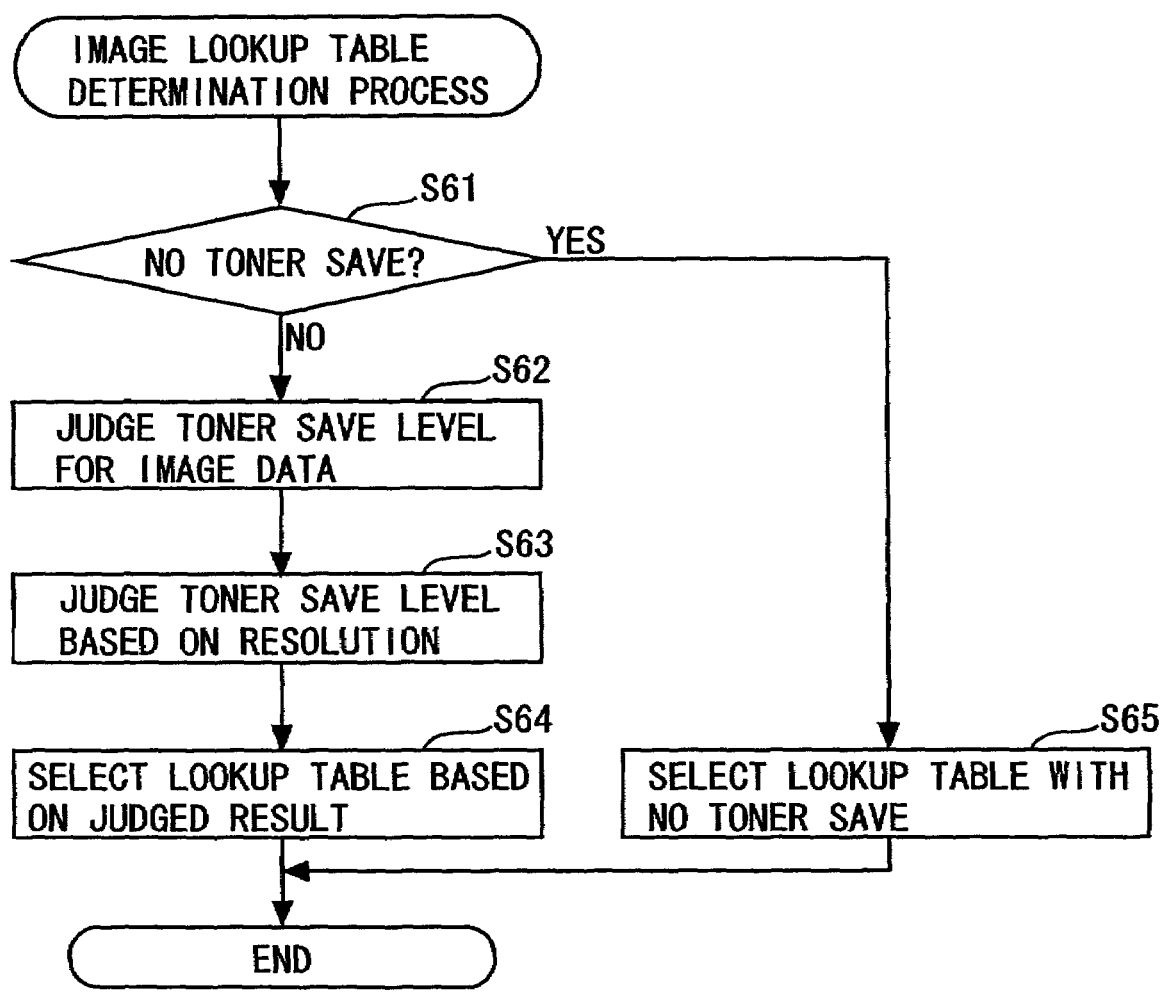
FIG. 9 is a flowchart showing details of a lookup table determination process for images.

FIG. 1 is a diagram showing an example of system architecture of this printing system. FIG. 2 is a diagram showing an architecture of functions of this printing system. FIG. 3 shows an example of a menu screen displayed on a display 3 shown in FIG. 1. FIG. 4 shows an example of one of lookup tables for color conversions based on toner save levels. FIG. 5 is a diagram showing a structure of a selection table for selecting the lookup table shown in FIG. 4. FIG. 6 is a flowchart showing a toner save process in the first embodiment. FIG. 7 is a flowchart showing details of a lookup table determination process for characters shown in FIG. 6. FIG. 8 is a flowchart showing details of a lookup table determination process for graphics shown in FIG. 6. FIG. 9 is a flowchart showing details of a lookup table determination process for images shown in FIG. 6.

<System Architecture>

FIG. 1 is the diagram showing the system architecture of the printing system. This printing system includes a host computer 1, a color printer 2 for printing pieces of information outputted by the host computer 1, a display 3 for displaying data processed by the host computer 1, menus, icons and others on a screen, and a keyboard 4 used for a user to input character information to the host computer 1.

The host computer 1 is, e.g., a main unit of a personal computer, and a server device. The host computer 1 includes a CPU, a memory, a hard disk and so on, which are not illustrated. The architecture and functions of this type of host computer 1 are broadly known, and their explanations are herein omitted.

The color printer 2 is a device that receives a command from the host computer 1 and prints the information outputted by the host computer 1 on a sheet. What is characteristic of the printing system in the first embodiment is a function of adjusting a quantity of how much a color material (which will hereinafter be referred to as a toner) is used for printing.

Accordingly, there is no limit to printing methods as hardware of the color printer 2. Namely, what is usable as the color printer 2 may be various types of printers such as an inkjet printer, a bubble jet printer, a laser printer, a thermal transfer printer and so on.

The host computer 1 is connected via a variety of interfaces to the color printer 2. The connection therebetween may involve the use of the hardware interface such as a serial interface like USB (Universal Serial Bus) etc and a parallel interface like SCSI (Small computer System Interface), a Centronics-based interface etc. A LAN such as Ethernet and others may also be extended between the host computer 1 and the color printer 2. In this case, a connection between the color printer 2 and the LAN may be established by use of a printer server.

Further, the information is transferred and received between the host computer 1 and the color printer 2 in accordance with various categories of printer control languages, page description languages and a command sequence (which may also be called an escape sequence). Such a known control language is, for example, "Postscript".

Moreover, a variety of command sequences are disclosed for every printer maker. For instance, the command sequence such as ESC (Escape Sequence Character)/PAGE etc is used.

The display 3 displays on the screen the information outputted by the host computer 1, the menus, the icons and others. The display 3 is, e.g., a CRT, a liquid crystal display and so on.

The keyboard 4 is used for the user to input the character information and so forth to the host computer 1. Various types of pointing devices such as a mouse, a trackball, a stick type pointing device, an electrostatic pointing device etc may be connected as an input device in addition to the keyboard 4 to the host computer 1.

<Function Architecture>

FIG. 2 shows the function architecture of the toner save function in the present printing system. In the first embodiment, this toner save function is actualized as a program on, e.g., the host computer 1.

As shown in FIG. 2, the toner save function is constructed of a draw specifying module 11 of an application program (that is simply termed "Application" in FIG. 2), a character/graphic/image distinguishing module 12, a character toner save level selection module 13, a graphic toner save level selection module 14, an image toner save level selection module 15, a draw-attribute-based toner save level adjusting module 16, a print-resolution-based toner save level adjusting module 17, a color conversion mode selection module 18, color conversion modules 19-1 to 19-N, a bitmap development module 20, and a bitmap data print module 21.

The draw specifying module 11 of the application program is, for example, a print menu displayed in a menu bar in a window. A user's request for printing is transferred through this print menu to the printing system.

The character/graphic/image distinguishing module 12 is a program module for distinguishing between a character, a graphic and an image of print target information. The print data specified by the application program are specified as character/graphic/image attribute commands and a draw command in accordance with a rule of a predetermined page description language.

For example, on the platform of Windows system, a draw command interface (function call) defined as GDI (Graphic Device Interface) which is transferred as application program⇒ OS⇒ printer drive, is specified.

Hence, for instance, in the case of implementing the toner save with the printer driver, one of the character/graphic/image. draw commands is uniquely recognizable within functions of a graphics library called by the function call given from the application program.

The character toner save level selection module 13, when printing the character data, adjusts a toner save level, i.e., a toner spent quantity.

Further, the graphic toner save level selection module 14, when printing the graphic data, adjusts the toner save level, i.e., the toner spent quantity. Herein, the graphic data are defined as a pattern drawn by lines and dots. In the graphic data, a dot, a line, a variety of polygons, circular arcs etc are defined in distinction from other points, lines polygons and circular arcs.

Moreover, the image toner save level selection module 15, when printing the image data, adjusts the toner save level, i.e., the toner spent quantity. Herein, the image data are defined as a pattern expressed as an aggregation of dots known as pixels. The image data are, however, unlike the graphic data, undistinguishable individually between the dot, line and graphic within the image.

The draw-attribute-based toner save level adjusting module 16 adjusts the toner save level in accordance with draw target attributes. The draw target attributes are, for example, a character dimension, a line width, a dot size and so on.

The draw-attribute-based toner save level adjusting module 16 executes a process of restraining the toner save with respect to a small character, a thin line and a fine dot which are equal to less than predetermined values. Further, the draw-attribute-based toner save level adjusting module 16 rules a fill pattern to the area such as a hatching pattern and a dot pattern out of thin-out processing targets.

The print-resolution-based toner save level adjusting module 17 adjusts the toner save level in accordance with a print resolution. For instance, in a low resolution mode, the print-resolution-based toner save level adjusting module 17 increases the tone save level to a value of an user's specification. Further, in a high resolution mode, the print-resolution-based toner save level adjusting module 17 decreases the toner save level to a value of an user's specification, and so forth.

The color conversion mode selection module 18 selects a proper color conversion module among the color conversion modules 19-1 to 19-N, corresponding to the toner save level adjusted in the process by each of the modules described above. The color conversion modules 19-1 to 19-N convert the color data expressed in colors R, G and B into coloring data (Y: Yellow, M: Magenta, C: Cyan, and K: Black) of the toners used by the color printer 2.

The bitmap development module 20 develops the draw target into bitmapped data Y, M, C and K. The bitmap data print module 21 transfers the bitmapped data developed by the bitmap development module 20 to the toner output unit of the color printer 2.

<Menu Screen>

FIG. 3 shows the example of the menu screen displayed on the display 3. The user specifies the toner save level on this menu screen when printing.

For example, the user sets an uppermost checkbox 101 effective, whereby the toner save function displays a detail setting menu. Then, all data batchwise checkbox 102, and three pieces of radio buttons thereunder (a character radio button 103, a graphic radio button 104 and an image radio button 105) are displayed in the detail setting menu.

When the user sets the batchwise checkbox 102 effective, the respective radio buttons are displayed in gray-out. As a result, the character radio button 103 and other buttons 104, 105 are unusable, and the toner save is specified at a uniform level with respect to the three categories of draw data.

One of "small", "Medium" and "large" toner save levels is selected in a side bar displayed on the right side. Herein, the "large" toner save level is a setting for saving the toner with a predetermined value or larger. Further, the "small" toner save level is a setting for saving the toner with the predetermined value or smaller. Moreover, the "Medium" toner save level is a setting assumed to be specified most in a normal case.

When setting the all data batchwise checkbox 102 ineffective, the gray-out display of the three radio buttons 103 through 105 is canceled, and these buttons become selectable. In the selectable state of these radio buttons 103 to 105, when setting these buttons effective, the slide bar for each item of data is selectable. If the radio button is not set effective, however, the tone save for the data set with this ineffective radio button is not executed.

Contents set on this menu screen are stored in predetermined storage areas on the host computer 1, and are read by the program implementing the toner save function.

<Data Structure>

FIG. 4 shows the lookup tables (1 through N) retained by the color conversion modules 19-1 to 19-N. In this lookup table, a color conversion such as RGB=>YMCK is specified based on the toner save level. Referring again to FIG. 4, the numerals 1 to N shown in a left upper portion indicate categories of the lookup tables. In the first embodiment, for instance, the color conversion module 19-1 executes the color conversion based on this lookup table (1).

Each of the lookup tables (1 through N) contains toner quantities (values of Y, M, C and K) needed for colorings of the R, G and B values. This mapping is obtained by a colorimetric device (e.g., a variable angle spectrophotometer) that actually measures a print sample with the Y,M,C and K values.

As a result of such a measurement, plural sets of YMCK values ((yi, mi, ci, ki), where i=1, . . . N) approximate to colors exhibiting specific RGB values (r, g, b) are obtained within a predetermined color difference range. The color difference is a difference between the values measured by the colorimetric device.

In such a color conversion from (r, g, b) into (yi, mi, ci, ki), the lookup table (1) retains a combination exhibiting a maximum toner spent quantity. The large toner spent quantity implies basically a large total value of the respective values of (yi, mi, ci, ki).

Further, the lookup table (2) retains a combination exhibiting the second largest toner spent quantity. Thus, in each color conversion from (r, g, b) into (yi, mi, ci, ki), the lookup tables (1 through N) are created in sequence according to the toner use quantities.

As described above, for example, the lookup table (N) retains a combination of (yi, mi, ci, ki) exhibiting a minimum toner spent quantity. If retaining such an RGB combination for all of values 0 through 255, however, entries for 256×256×256=3,670,016 colors per lookup table are needed, and the colorimetric process is enormously time-consuming.

Such being the case, according to the first embodiment, each lookup table is prepared with the RGB values on every 16-unit basis and retains (yi, mi, ci, ki) values corresponding thereto. In this case, one single lookup table needs 4096 pieces of entries (16×16×16=4096). Further, the (yi, mi, ci, ki) corresponding to the RGB values other than those value may be obtained by interpolation.

FIG. 5 illustrates a data structure of the selection table. This selection table is used for the character tone save level selection module 13, the graphic toner save level selection module 14, the image toner save level selection module 15, the draw-attribute-based toner save level adjusting module 16 and the print-resolution-based toner save level adjusting module 17 to select the lookup tables (1 to N). Namely, this selection table may be defined as a sort of decision table.

As shown in FIG. 5, this selection table has a "character/graphic/image category" field, a "toner save level" field, a "draw attribute category" field, a "print resolution" field, and a "lookup table" field.

In the "character/graphic/image category" field, any one of the character, the graphic and the image is selected as a print target.

In the "toner save level" field, one of the toner save levels (specified in the menu shown in FIG. 3) is selected in the category selected above.

In the "draw attribute category" field, a drawing size (point) is selected corresponding to an attribute of the draw target in the above-selected category of the character or the graphic or the image and in the above-selected category of the toner save level. In the "print resolution" field, one of the print resolutions is selected corresponding to a print resolution mode in the categories selected above. The "lookup table" field retains numbers by which the lookup tables are identified.

<Operation>

FIGS. 6 through 9 show a process (which will hereinafter be referred to as a toner save process (including character/graphic/image lookup table determination processes)) of the program for actualizing the toner save function. These processes are actualized as the program on, e.g., the host computer 1.

FIG. 6 shows an outline of the toner save process. In this process, to start with, a category of the print target data is judged (S1). Then, at first, it is judged whether the print target data are defined as characters (S2). If the print target data are the characters, the character lookup table determination process is executed (S3). Thereafter, the control in the toner save process proceeds to S7.

Whereas if not the characters, it is judged whether the print target data are graphics (S4). If judged to be the graphics, the graphic lookup table determination process is executed (S5). Thereafter, the control in the toner save process proceeds to S7.

Further, if not the graphics, the image lookup table determination process is executed (S6). Next, a color conversion through print process in the toner save process is executed (S7). Thereafter, the toner save process comes to an end.

FIG. 7 shows details of the character lookup table determination process (S3 in FIG. 6). In this determination process, to begin with, it is judged whether the toner save is specified (S31). If the toner save is not specified, the lookup table with no toner save is selected. In this case, the lookup table for a conversion into YMCK exhibiting a minimum color difference with respect to RGB, is selected (S36). Thereafter, the character lookup table determination process is finished.

While on the other hand, the judgement in S31 is that the toner save is specified, it is judged which character data toner save level is selected (S32). This process is a process of selecting the toner save level in such an entry that the character/graphic/image category in the selection table shown in FIG. 5 is the character.

Next, it is judged which toner save level is selected based on a character size (S33). This process is a process of selecting the draw attribute category (drawing size) in any one of the entries (any one of the toner save levels "Large", "Medium" and "Small") in the category "character" as the character/graphic/image category in the selection table shown in FIG. 5.

Subsequently, it is judged which toner save level is selected based on a resolution (S34). This process is a process of selecting the print resolution in the selection table shown in FIG. 5. Then, one of the lookup tables is selected based on the result of those judgements made above (S35). Thereafter, the character lookup table determination process comes to an end.

FIG. 8 shows details of the graphic lookup table determination process (S5 in FIG. 6). In this determination process, to start with, it is judged whether the toner save is specified (S51). If the toner save is not specified, the lookup table with no toner save is selected (S58). Thereafter, the graphic lookup table determination process is finished.

Whereas if judging in S51 that the toner save is specified, it is judged whether the print target data are defined as a fill pattern (S52). If the print target data are defined as the fill pattern, it is judged whether a rule-out of the toner save with respect to the fill pattern is specified (S53). If judging that the rule-out of the toner save with respect to the fill pattern is specified, the control in this process proceeds to S58.

Further, either if the print target is not the fill pattern or if the rule-out of the toner save with respect to the fill pattern is not specified, it is judged which graphic data toner save level is selected (S54). This process is a process of selecting one of the toner save levels in such an entry that the character/graphic/image category in the selection table shown in FIG. 5 is the graphic.

Next, it is judged which toner save level is selected based on a line width (S55). This process is a process of selecting the draw attribute category (drawing size) in any one of the entries (any one of the toner save levels "Large", "Medium" and "Small") in the category "graphic" as the character/graphic/image category in the selection table shown in FIG. 5.

Subsequently, it is judged which toner save level is selected based on a resolution (S56). This process is a process of selecting the print resolution in the selection table shown in FIG. 5. Then, one of the lookup tables is selected based on the result of those judgements made above (S57). Thereafter, the graphic lookup table determination process comes to an end.

FIG. 9 shows details of the image lookup table determination process (S6 in FIG. 6). In this determination process, at first, it is judged whether the toner save is specified (S61). If the toner save is not specified, the lookup table with no toner save is selected (S65). Thereafter, the image lookup table determination process is finished.

Whereas if judging in S61 that the toner save is specified, it is judged which toner save level is selected for the image data (S62). This process is a process of selecting the toner save level in such an entry that the character/graphic/image category in the selection table shown in FIG. 5 is the image.

Next, it is judged which toner save level is selected based on a resolution (S63 This process is a process of selecting the print resolution in the selection table shown in FIG. 5. Then, one of the lookup tables is selected based on the result of those judgements made above (S64). Thereafter, the image lookup table determination process is finished.

<Effects of Embodiment>

As discussed above, the present printing system is capable of such a print control process that, for instance, the toners for the characters and graphics are saved to attain the conversion into a brighter color, while the toners for the images are not saved to provide an optimum color tone.

Further, the present printing system is capable of printing in a way that sets the toner save level different depending on the character, the graphic and the image.

Moreover, the present printing system is capable of printing in a way that relieves or enhances the effect of the toner save corresponding to the draw attributes such as the character size, the line width and so on.

Still further, the present printing system restrains the toner save function with respect to the fill pattern in accordance with the condition specified. It is therefore possible to reduce ununiformity in print that is caused by an interference between a periodicity of the print pattern and the toner save process.

Yet further, the present printing system executes the color conversion so that a degree of influence by the color difference level upon each color falls within the fixed range, thereby ensuring the print quality at the practical level.

<Modified Example>

The embodiment discussed above has exemplified the example of the color conversion process involving the use of the lookup tables. The embodiment of the present invention is not, however, limited to the above architecture and procedures. For example, the color conversion may be executed based on a conversion formula from RGB into YMCK as a substitute for the lookup table based color conversion. This type of generally known conversion method is a method using a masking equation.

At first, a complementary color relationship between the respective colors RGB and YMC is theoretically established. It is, however, assumed herein that RGB values/YMC values be treated as digital data 0 through 255.

$$C = 255 - R \qquad \text{[Formula 1]}$$

$$M = 255 - G$$

$$Y = 255 - B$$

The color in the actual printing is influenced by the characteristics of the sheet, the toners and others, and hence the relationship between RGB and YMC can be expressed as by a method using the masking equation in the following formula 2:

$$\begin{bmatrix} C \\ M \\ Y \end{bmatrix} = \begin{bmatrix} a11 & a12 & a13 \\ a21 & a22 & a23 \\ a31 & a32 & a33 \end{bmatrix} \begin{bmatrix} 255 - R \\ 255 - G \\ 255 - B \end{bmatrix} + \begin{bmatrix} c1 \\ c2 \\ c3 \end{bmatrix} \qquad \text{[Formula 2]}$$

where if it is assumed that a11=a22=a33=1/a12=a13=a21=a23=a31=a32=c1=c2=c3=0, this is the same as the complementary color conversion (Formula 1) given above. The theory of such a color conversion is discussed in, e.g., [Basic and Applied Study of Color Matching] compiled by Japan Color Research Institute, issued by Nikkan Kogyou Shinbun.

Accordingly, as in the first embodiment, the color conversing using the formula 2 may be done instead of performing the color conversion based on the lookup tables. In this case, the color converted and printed with the set values of a11 through a33 and c1 through c3 may be measured by use of the colorimeter.

Then, there is obtained such a coefficient matrix (a11I, a22I, a33I, a12I, a13I, a21I, a23I, a31I, a32I, c1I, c2I, c3I) (where i=1, . . . N) that the color difference between the RGB-based color before the conversion and the calorimetric result falls within the predetermined range. Further, a toner spent quantity is obtained from the YMC values after the conversion on the basis of each coefficient matrix, and the toner use quantities and the coefficient matrixes may be stored in sequence according to the use quantities.

Thus, the coefficient matrixes may be referred to instead of referring to the lookup tables in the selection table as in the first embodiment. Then, the coefficient matrix referred to is applied to the formula 2, wherein the conversion from RGB into YMC may be carried out. Note that K (black) may be added after the conversion from RGB into YMC has been done.

In the first embodiment, the toner save function is actualized by way of the program on the host computer 1. The embodiment of the present invention is not, however, confined to the architecture and procedures described above. For instance, the toner save function may be actualized within the color printer 2.

In this case, the print target data are described in a predetermined page description language or command sequence, and are transferred to the color printer 2 from the host computer 1. The page description language or the command sequence are interpreted by, e.g., firmware, hardware or a program within the color printer 2, and drives (controls) the color printer 2.

Namely, interfaces of the draw commands are specified by the page description language such as "Postscript" etc or the command sequence such as ESC/PAGE etc. Therefore, a command analyzing module on the printer side can distinguish between the draw targets (character/graphic/image) and between the respective draw attributes. Accordingly, the toner save function exemplified in the embodiment discussed above can be actualized as it is in a control system within the color printer 2.

In this case, the menu as shown in FIG. 3 may be provided on the side of the host computer 1 or may also be provided on an operation unit (which is generally what normally includes a liquid crystal panel and an operation button suite) of the color printer 2.

In the case of providing this menu on the host computer 1, the contents set when printing may be transmitted to the color printer 2 from the host computer 1. This method is suited to an environment in which a multiplicity of users share the color printer 2 on the network. This is because the contents set by each individual do not exert any influence upon print qualities of others.

Note that some of the functions illustrated in FIG. 2 may be actualized by way of the program on the host computer 1, and the rest of those functions may be actualized by the firmware, the hardware or the program within the color printer 2.

For example, the draw specifying module 11 may be actualized on the host computer 1, and the character/graphic/image distinguishing module 12 through the bitmap data print module 21 may be actualized within the color printer 2.

Further, for instance, the draw specifying module 11 through the bitmap development module 20 may be actualized on the host computer, and the bitmap data print module 21 may be actualized within the color printer 2.

Still further, for example, the draw specifying module 11 through the print-resolution-based toner save level adjusting module 17 may be actualized on the host computer 1, and the color conversion mode selection module 18 through the bitmap data print module 21 may be actualized within the color printer 2.

In the embodiment discussed above, the printing system retains the multiplicity (N-pieces of categories as shown in FIG. 4) of lookup tables corresponding to the toner save levels. Then, a proper lookup table in the selection table shown in FIG. 5 is selected in accordance with the condition of the print target. In this case, the number of categories of the lookup tables may be properly set corresponding to a scale and a capacity of the system. For example, when scheming to finely adjust the toner save level, the multiplicity of lookup tables may be prepared. Further, if allowed to roughly adjust the toner save level, a small number of lookup tables may be prepared.

In the embodiment discussed above, the lookup table is provided with 4096 entries in a way that varies RGB values on every 16-unit basis. The embodiment of the present invention is not, however, restricted to this architecture. The lookup table may be provided with the entries on a much finer basis and may also be provided with the entries on a much rougher basis.

Second Embodiment

The printing system in a second embodiment of the present invention will hereinafter be described with reference to FIGS. 10 through 14.

Figure 13:
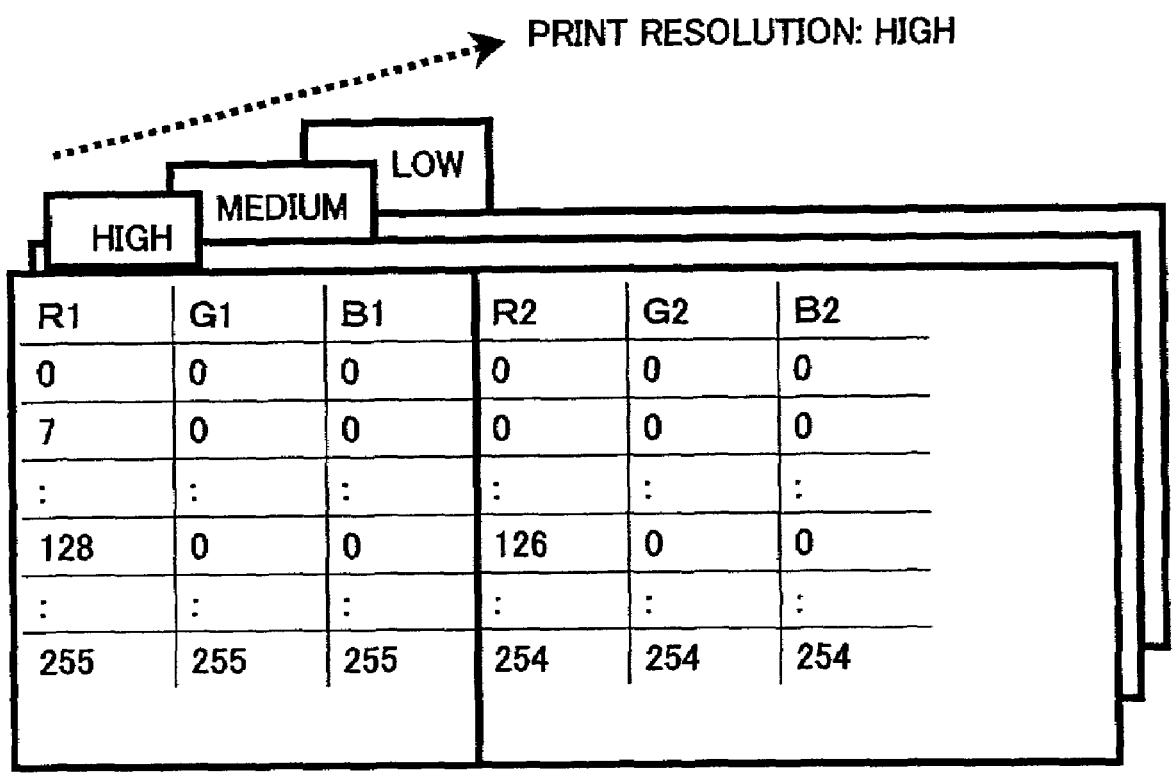
FIG. 13 is a diagram showing a data structure of a lookup table for a print-resolution-based color conversion.
Figure 14:
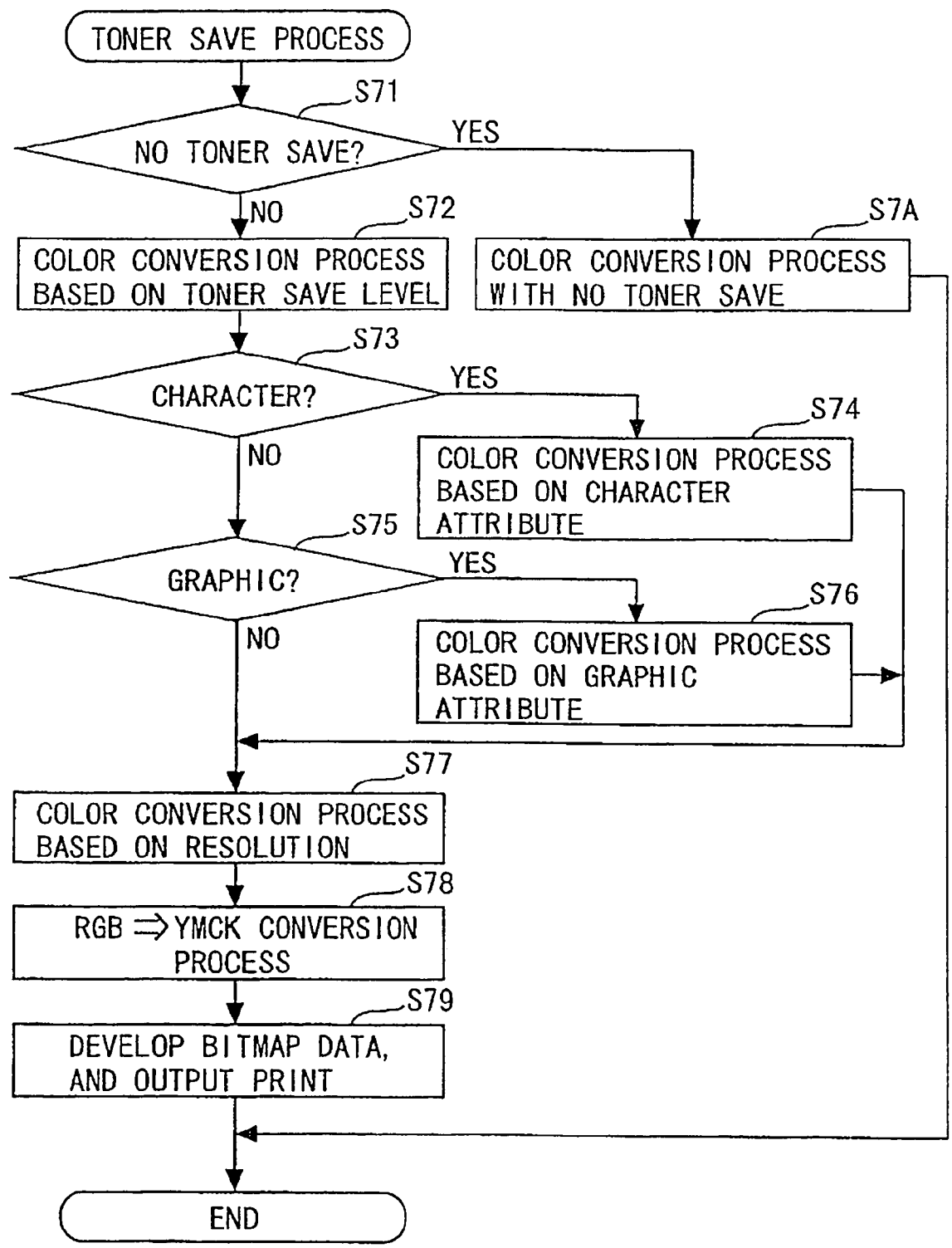
FIG. 14 is a flowchart showing a toner save process in the second embodiment.

FIG. 10 is a diagram showing a data structure of a lookup table for the color conversion based on the toner save levels in the second embodiment. FIG. 11 is a diagram showing a data structure of a lookup table for a character-attribute-based color conversion in this printing system. FIG. 12 is a diagram showing a data structure of a lookup table for a graphic-attribute-based color conversion. FIG. 13 is a diagram showing a data structure of a lookup table for a print-resolution-based color conversion. FIG. 14 is a flowchart showing a toner save process in the second embodiment.

The discussion in the first embodiment has focused on the printing system in which one of the lookup tables shown in FIG. 4 is selected in accordance with the selection table (FIG. 5), and the conversion from RGB into YMCK is carried out.

The discussion in the second embodiment will be focused on the printing system in which the above conversion is executed stepwise. The stepwise conversion implies a process, wherein, for example, if the print target data are the character data, at first, the color conversion is performed based on the toner save level, next the color conversion for adjusting the toner save level is executed based on the character attribute, and subsequently the color conversion for adjusting the toner save level is executed based on the print resolution.

In this case, the color conversion in each step is a color conversion from the RGB space into the RGB space, and finally the color conversion from the RGB space into the YMCK space is executed.

In such a case, the lookup table shown in FIG. 4 consists of a color conversion table for the conversion from the RGB space into the RGB space in each step and a color conversion table for the conversion from the RGB space into the YMCK space.

Other configurations and operations in the present printing system are the same as those in the first embodiment. The same components are therefore marked with the same numerals, and the repetitive explanations thereof are omitted. Further, the drawings of FIGS. 1 through 9 are referred to when the necessity arises.

<Data Structure>

FIG. 10 shows the lookup tables for the color conversion from the RGB values (R1,G1,B1) into the RGB values (R2, G2, B2) for the toner save. Referring to FIG. 10, R1, G1 and B1 are the RGB color values before the conversion, and R2, G2 and B2 are the RGB color values after the conversion.

This table is created in the following procedures. To start with, a plurality of RGB values (R2, G2, B2) of the colors of which brightness is changed from the RGB values (R1, G1, B1), are obtained. Mappings of conversion from the respective values R1, G1 and B1 into the plurality of values R2, G2 and B2, are thereby obtained.

Next, the colors of the thus obtained R2G2B2 values are converted into YMCK values by the normal color conversion with no toner save, thereby obtaining a toner spent quantity (a total sum of the YMCK values). Then, the mappings of conversion from the R1G1B1 values into the plurality of R2G2B2 values are arranged in the tables 1 through N in sequence according to the toner use quantities. The lookup tables for the toner save are thus created.

FIG. 11 illustrates a lookup table for a character-attribute-based color conversion. This lookup table serves for the color conversion, wherein the brightness is changed by a predetermined quantity according to every character size indicated by an index "Small" or "Medium" or "Larger" in a left upper portion in FIG. 12.

To be specific, the table with the index "Small" is the color conversion lookup table for the character of which the character size is smaller than, for example, 5 points. In this color conversion, for instance, the brightness of each of the RGB colors is dimmed on a 10-unit basis (255 levels). The character having the character size smaller than 5 point is color-converted in such a direction as to relieve the toner save by decreasing the brightness.

Further, the table with the index "Medium" is the color conversion lookup table for the character of which the character size is equal to or larger than, for example, 5 points but smaller than 10 points. In this color conversion, for instance, the brightness of each of the RGB colors is dimmed on a 5-unit basis (255 levels). The character having the character size equal to or larger than 5 points but smaller than 10 points is thereby color-converted in such a direction as to slightly relieve the toner save.

Moreover, the table with the index "Large" is the color conversion lookup table for the character of which the character size is equal to or larger than, for example, 10 points. In this color conversion, for example, the brightness of each of the RGB colors is increased on the 5-unit basis (255 levels). The character having the character size equal to or larger than 10 points is thereby color-converted in such a direction as to give a slight boost to the toner save.

FIG. 12 illustrates lookup tables for a graphic-attribute-based color conversion. These lookup tables are categorized based on the line widths indicated by indexes "Fine", "Medium" and "Bold" in a left upper potion in FIG. 12. This lookup table serves for the color conversion, wherein the brightness is changed by a predetermined quantity according to every line width.

Specifically, the table with the index "Fine" is the color conversion lookup table for the graphic of which the line width is smaller than, for example, 1 point. In this color conversion, for instance, the brightness of each of the RGB colors is dimmed on the 10-unit basis (255 levels). The graphic having the line width smaller than 1 point is color-converted in such a direction as to relieve the toner save by decreasing the brightness.

Further, the table with the index "Medium" is the color conversion lookup table for the graphic of which the line width is equal to or larger than, for example, 1 point but smaller than 2 points. In this color conversion, for instance, the brightness of each of the RGB colors is dimmed on the 5-unit basis (255 levels). The graphic having the line width equal 1 to or larger than 1 point but smaller than 2 points is thereby color-converted in such a direction as to slightly relieve the toner save.

Moreover, the table with the index "Bold" is the color conversion lookup table for the graphic of which the line width is equal to or larger than, for example, 2 points. In this color conversion, for example, the brightness of each of the RGB colors is increased on the 5-unit basis (255 levels). The graphic having the line width equal to or larger than 10 points is thereby color-converted in such a direction as to give a slight boost to the toner save.

As described above, the printing system in the second embodiment executes the color conversion in a way that relieves or gives a boost to the toner save according to the draw attributes such as the character size, the line width and so on.

FIG. 13 illustrates lookup tables for a print-resolution-based color conversion. These lookup tables are categorized based on the resolutions used when printing as indicated by indexes "High", "Medium" and "Low" in a left upper potion in FIG. 13. This lookup table serves for the color conversion, wherein the brightness is changed by a predetermined quantity according to every resolution.

Specifically, the table with the index "High" is the color conversion lookup table for a print with a high-resolution on the order of, e.g., 600 dots/in. or above. In this color conversion, for instance, the brightness of each of the RGB colors is dimmed on the 10-unit basis (255 levels). The high-resolution print involves performing the color conversion in such a direction as to relieve the toner save by decreasing the brightness.

Further, the table with the index "Medium" is the color conversion lookup table for a print with a medium resolution that is equal to or larger than, e.g., 300 dots/in. but or less than 600 dot/in. In this color conversion, for instance, the brightness of each of the RGB colors is dimmed on the 5-unit basis (255 levels). With this processing, the medium-resolution print involves performing the color conversion in such a direction as to slightly relieve the toner save.

Moreover, the table with the index "Low" is the color conversion lookup table for a print with a low resolution that is, e.g., lower than 300 dots/in. In this color conversion, for example, the brightness of each of the RGB colors is increased on the 5-unit basis (255 levels). With this processing, the low-resolution print involves performing the color conversion in such a direction as to give a slight boost to the toner save.

As explained above, the printing system in the second embodiment executes the color conversion in a way that relieves or gives a boost to the toner save according to the resolution used when printing.

<Operation>

FIG. 14 shows an outline of the toner save process. In this process, at first, it is judged whether the toner save is specified (S71). If not specified, the process is the same (S36 in FIG. 7 and others) as in the case of the printing system in the first embodiment, and therefore its repetitive explanation is omitted.

Whereas it judging in S71 that the toner save is specified, the color conversion process based on the toner save levels is executed (S72). This process is the toner save process based on specifying in the all data batchwise checkbox shown in FIG. 3 in the first embodiment. This toner save process is executed in the same procedures as those in the first embodiment in accordance with the lookup tables shown in FIG. 10.

Next, it is judged whether the print target data are defined as characters (S73). If the print target data are the characters, a character-attribute-based color conversion process is executed (S74). This process is the color conversion process using the lookup tables shown in FIG. 11. Thereafter, the control in the toner save process proceeds to S77.

Whereas if not the characters, it is judged whether the print target data are graphics (S75). If judged to be the graphics, a graphic-attribute-based color conversion process is executed (S76). This process is the color conversion process using the lookup tables shown in FIG. 12. Thereafter, the control in the toner save process proceeds to S77.

Further, if not the graphics, a resolution-based color conversion process is executed (S77). This process is the color conversion process using the lookup tables shown in FIG. 13.

Next, the toner save process involves executing an (RGB⇒YMCK) conversion process (S78). This process is a normal conversion process, wherein the toner save is not carried out. Next, the toner save process involves executing a development through a print output of the bitmap data (S79). Thereafter, the toner save process comes to an end.

<Effects of Embodiment>

As discussed above, the printing system in the second embodiment executes the color conversion stepwise based on the toner save level specified by the user, the attribute of the print target data and the resolution used when printing. Therefore, the number of the color conversion tables is the numerical value obtained by adding the number of the color conversion tables at the respective levels, and the toner save can be actualized by use of the smaller number of the color conversion tables than in the first embodiment.

<Modified Example>

According to the second embodiment, the color conversion is executed stepwise based on the toner save level specified by the user, the attribute of the print target data and the resolution used when printing. The embodiment of the present invention is not, however, limited to these procedures.

For example, the lookup tables for the respective levels shown in FIGS. 10 through 13 and the lookup tables for the (RGB⇒ YMCK) conversion process (S78 in FIG. 14), may all be synthesized. In this case, as in the first embodiment, it follows that the multiplicity of color conversion tables are generated corresponding to the conditions such as the print target data attributes, the resolutions used when printing and others. For example, in the case of preparing N-categories of color conversion tables based on the toner save levels, M-categories of color conversion tables based on the print target data attributes and L-categories of color conversion tables based on the print resolutions, after synthesizing these tables, (N X M X L) categories of color conversion tables are generated.

The plurality of these conversion tables may, however, be categorized corresponding to the toner save levels (a total sum of the respective YMCK values). Then, one single table may substitute for the plurality of tables coming under each category. With this scheme, the printing system may retain the lookup tables of which the number corresponds to the number of categories of the toner save levels among the essentially required (N X M X L) categories of color conversion tables.

In this case, the number of categories of the lookup tables may be properly determined corresponding to the scale and capacity of the printing system. For instance, when scheming to finely adjust the toner save level, the multiplicity of lookup tables may be prepared. Further, if allowed to roughly adjust the toner save level, a small number of lookup tables may be prepared.

Third Embodiment

The printing system in a third embodiment of the present invention will hereinafter be described with reference to FIGS. 15 and 16.

Figure 15:
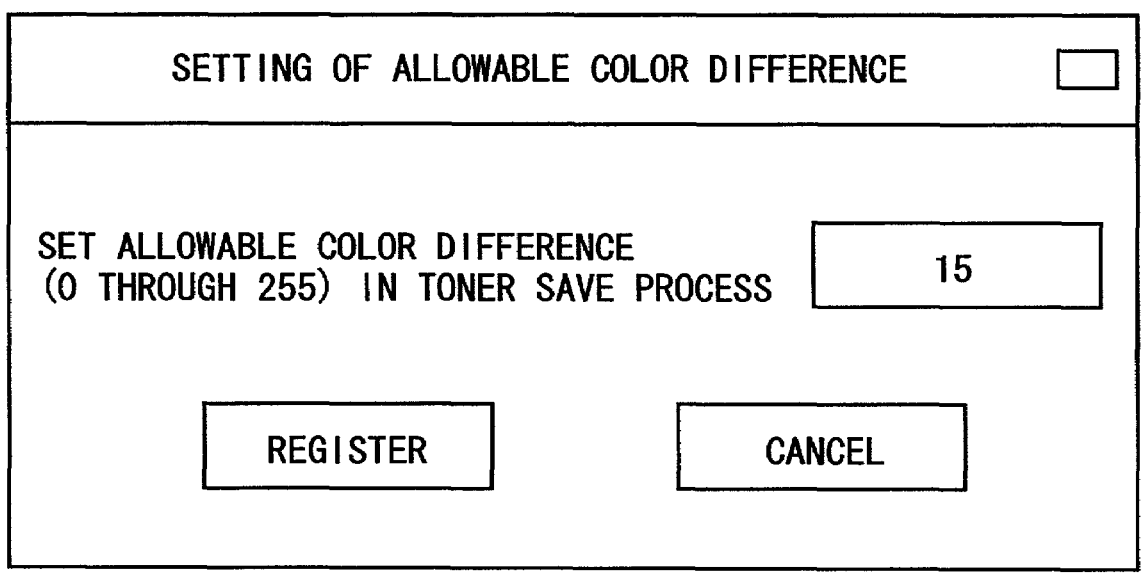
FIG. 15 is a diagram showing an example of a setting screen for specifying an allowable color difference when printing in a third embodiment.

FIG. 15 shows an example of a setting screen for specifying an allowable color difference when printing in the third embodiment. FIG. 16 is a flowchart showing a lookup table creating process for performing the toner save within a range of the allowable color difference.

The printing system discussed in the first and second embodiments is that the toner save is executed based on what is specified by the user on the menu screen shown in FIG. 3, and that one of the lookup tables illustrated in FIG. 4 is selected in accordance with the selection table (FIG. 5), and the conversion from RGB into YMCK is carried out.

What will be discussed in the third embodiment is the printing system for executing the toner save within an allowable color difference range specified by the user. Other configurations and operations in this printing system are the same as those in the first or second embodiment. Then, the same components are marked with the same numerals, and repetitive explanations are omitted. Further, the drawings of FIGS. 1 through 14 will be referred to when the necessity arises.

<Setting Screen>

FIG. 15 shows an allowable color difference setting window for setting an allowable color difference. This allowable color difference setting window is displayed on the display 3 shown in FIG. 1 or on an unillustrated operation panel of the color printer 2.

As shown in FIG. 15, the allowable color difference setting window contains a title box where "setting of allowable color difference" is entered, and a setting box (where a value "15" is set in FIG. 15) for setting the allowable color difference within a range of 0 through 255, a "register" button and a "cancel" button.

The user sets, in this window, an allowable color difference within the range of 0 through 255 when executing the tone save. Further, when the user presses (clicks) the "register" button by an unillustrated pointing device, the set value ("15" in FIG. 15) as the allowable color difference is registered. This allowable color difference is used for generating the color conversion lookup table.

While on the other hand, when the user clicks the "cancel" button, the set allowable color difference is canceled, and the processing in the allowable color difference setting window is finished.

<Operation>

Figure 16:
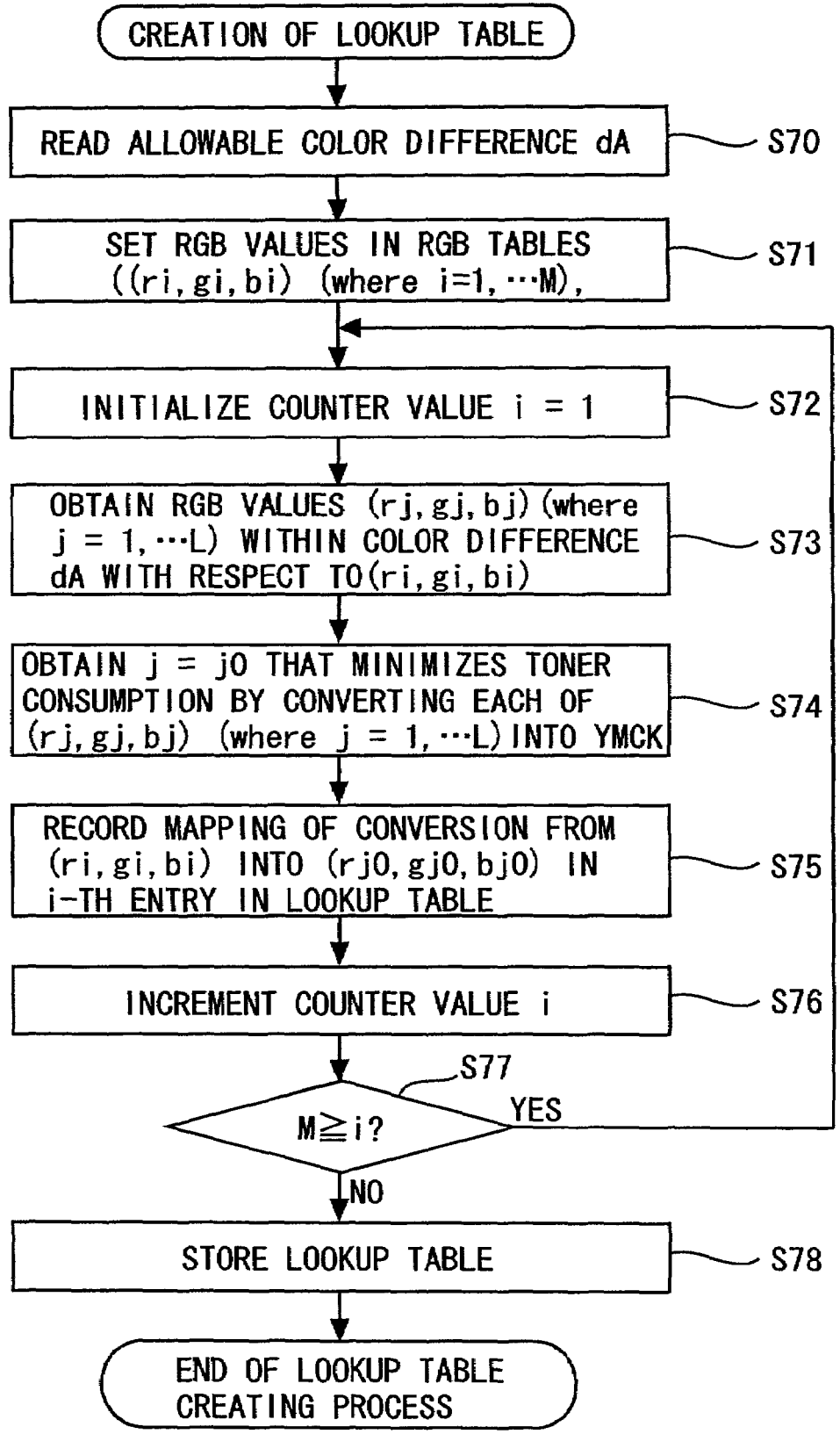
FIG. 16 is a flowchart showing a lookup table creating process for performing the toner save within a range of the allowable color difference.

FIG. 16 shows a lookup table creating process for the color conversion within the allowable color difference range. An execution of this process is triggered by such an event that the user makes a request (which implies a click on an unillustrated table creation request button on the display 3 or on the screen of the operation panel) for creating the lookup table.

In this table creating process, at first, a registered allowable color difference dA is read (S70). Subsequently, an RGB table for the operation is ensured, and RGB values (ri, gi, bi) (where i=1, ... M) are set (S71). These RGB values are set on every 8-unit basis such as (0,0,0), (7,0,0), (14,0,0), ... ,(255,0,0), (255,7,0), ... (255,255,255). In this case, The number "M" of combinations of (ri,gi,bi) is given such as 32×32×32=32768.

Next, a counter value i is initialized to "1" (S71). Subsequently, RGB values ((rj,gj,bj) (where j=1, ... L) falling within the color difference dA range with respect to (ri,gi,bi), are obtained (S73).

Then, when the thus obtained RGB values (rj,gj,bj) (where j=1, ... L) are color-converted into YMCK values, there is obtained such j (it is now assumed that this value be j0) as to minimize the toner consuming quantity (that is a total value given by Y+M+C+K) (S74).

Next, an (ri,gi,bi)-to-(rj,gj,bj) conversion mapping is recorded in an i-th entry of the lookup table (S75).

Subsequently, the counter value i is incremented (S76). Then, it is judged whether the counter value i exceeds a count M in (ri,gi,bi) (S77). Thus, the processes in S72 through S75 are repeated for all of (ri,gi,bi).

Next, the created lookup table is stored (S78). Thereafter, the lookup table creating process comes to an end.

The color conversion may be executed based on the thus created lookup table in the same way as done in the first or second embodiment. In this case, the lookup table for the RGB-to-YMCK color conversion with no toner save may be combined with the lookup table created by the processing in FIG. 16.

<Effect of Embodiment>

As discussed above, the printing system in the third embodiment is capable of creating the lookup table used for executing the color conversion so that the toner consuming quantity is minimized within the color difference dA range specified by the user. The color conversion is executed in a way that combines this lookup table with the lookup table for the RGB-to-YMCK color conversion with no toner save, whereby the color conversion can be executed so that the toner consuming quantity is minimized within the color difference range specified by the user, i.e., so that the toner save is maximized.

In this case, the color conversion may be executed individually based on the lookup table for the toner save and the lookup table for the RGB-to-YMCK color conversion. Further, the two types of tables may be synthesized, and the color conversions may also be executed at one time.

<Modified Example>

According to the third embodiment, all sets (L-sets) of RGB values (rj,gj,bj) falling within the color difference dA range with respect to the RGB values (ri,gi,bi), are obtained, and such a value of j as to maximize the toner save is determined. The embodiment of the present invention is not, however, restricted such procedures.

For example, there may be determined such a value of j as to maximize the toner save with respect to a predetermined number of samples among the L-sets of RGB values (rj,gj,bj) described above.

The sample may be obtained by, for instance, formally thinning out the sets of values (rj,gj,bj) obtained above. Namely, the sample may be extracted at an interval of the plural sets by sorting the sets of values (rj,gj,bj). Further, a predetermined number of sets may also be extracted as samples in sequence from those exhibiting a larger total value of rj+gj+bj in terms of a relationship of the complement shown in the formula 1.

According to the third embodiment, the lookup table is created on the 8-unit basis. The embodiment of the present invention is not, confined to the lookup table created on the 8-unit basis.

<<A Storage Medium Readable by a Machine>>

A program read by a computer to execute any one of the processes in the embodiments discussed above may be recorded on a A storage medium readable by a machine.

Then, the computer reads and executes the program on this storage medium, thereby providing the function of the printing system exemplified in the embodiments discussed above.

Herein, the storage medium readable by a machine embraces storage mediums capable of storing information such as data, programs, etc. electrically, magnetically, optically and mechanically or by chemical action, which can be all read by the computer. What is demountable out of the computer among those storage mediums maybe, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type storage mediums within the computer.

<<Data Communication Signal Embodied in Carrier Wave>>

Furthermore, the above program may be stored in the hard disk and the memory of the computer, and downloaded to other computers via communication media. In this case, the program is transmitted as data communication signals embodied in carrier waves via the communication media. Then, the computer downloaded with this program can be made to provide the function of the printing system.

Herein, the communication media may be any one of cable communication mediums such as metallic cables including a coaxial cable and a twisted pair cable, optical communication cables, or wireless communication media such as satellite communications, ground wave wireless communications, etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave maybe anyone of a modulated broadband signal and an unmodulated base band signal (corresponding to a case of setting a DC signal having a voltage of 0 as a carrier wave).

What is claimed is:

1. A print control system for controlling a print of print target data containing color specifying information, comprising:

a data distinguishing module distinguishing between pieces of element data contained in the print target data; and a color adjusting module adjusting a mix of color materials by converting the color specifying information into a color mix specifying information that specifies the mix of color materials according to a category of the element data, wherein said color adjusting module further comprises a print-resolution-based toner save level adjusting module that adjusts the toner spent quantity in accordance with print resolution, wherein said color adjusting module further comprises a character toner save level selection module, a graphic toner save level selection module, an image toner save level selection module, a draw-attribute-based toner save level adjusting module and a print-resolution-based toner save level adjusting module, wherein said character toner save level selection module adjusts a toner spent quantity when printing graphic data, wherein said graphic toner save level selection module adjusts the toner spent quantity when printing graphic data, wherein said image toner save level selection module adjusts the toner spent quantity when printing image data, wherein said draw-attribute-based toner save level adjusting module adjusts that toner spent quantity in accordance with draw target attributes which include character dimension, line width, and dot size, and wherein said color adjusting module adjusts a mix of color materials by converting the color specifying information into one of a plurality of color mix specifying information within a predetermined range of a color difference on the basis of a coloring value based on the color specifying information.

2. A print control system according to claim 1, further comprising a converting module converting the color specifying information into mix specifying information for specifying a mix of the color material, said color adjusting module adjusting the mix specifying information according to the category of the element data.

3. A print control system according to claim 2, further comprising an information input module inputting save specifying information for saving the color materials when printing according to the category of the element data, said color adjusting module saving the color materials when printing by adjusting the mix specifying information based on the save specifying information according to the category of the element data.

4. A print control system according to claim 2, further comprising a categorizing module categorizing the element data on the basis of dimension attributes, said color adjusting module adjusting the mix specifying information in accordance with the dimension attributes.

5. A print control system for controlling a print of print target data containing color specifying information, comprising:

an information input module inputting information on a color difference on the basis of a coloring value based on the color specifying information; and a color adjusting module adjusting a mix of color materials on the basis of the color specifying information within a range of the color difference, and minimizing a consuming quantity of the color materials, wherein said color adjusting module further comprises a print-resolution-based toner save level adjusting module that adjusts the toner quantity in accordance with print resolution, wherein a plurality of tables containing different mixes of color materials within the range of the color difference are maintained which minimize different levels of consuming quantities of the color materials.

6. A print control system according to claim 5, further comprising a converting module converting the color specifying information into mix specifying information for specifying a mix of the color material.

7. A print control method of controlling a print of print target data containing color specifying information, comprising:

distinguishing between pieces of element data contained in the print target data; and color adjustment adjusting a mix of color materials by converting the color specifying information into a color mix specifying information that specifies the mix of color materials according to a category of the element data, wherein said color adjustment adjusting further adjusts the toner spent quantity in accordance with print resolution, wherein said color adjusting step further comprises adjusting a toner spent quantity dependent upon whether the element data is character data, graphic data, image data, draw target attributes which include character dimension, line width, and dot size and print resolution, and wherein said color adjustment adjusts a mix of color materials by converting the color specifying information into one of a plurality of color mix specifying information within a predetermined range of a color difference on the basis of a coloring value based on the color specifying information.

8. A print control method according to claim 7, further comprising converting the color specifying information into mix specifying information for specifying a mix of the color material, said color adjustment adjusting the mix specifying information according to the category of the element data.

9. A print control method according to claim 8, further comprising inputting save specifying information for saving the color materials when printing according to the category of the element data, said color adjustment saving the color materials when printing by adjusting the mix specifying information based on the save specifying information according to the category of the element data.

10. A print control method according to claim 8, further comprising categorizing the element data on the basis of dimension attributes, said color adjustment adjusting the mix specifying information in accordance with the dimension attributes.

11. A print control method of controlling a print of print target data containing color specifying information, comprising:

inputting information on a color difference on the basis of a coloring value based on the color specifying information; and adjusting a mix of color materials on the basis of the color specifying information within a range of the color difference, and minimizing a consuming quantity of the color materials, wherein said adjusting further adjusts the toner spent quantity in accordance with print resolution, wherein a plurality of tables containing different mixes of color materials within the range of the color difference are maintained which minimize different levels of consuming quantities of the color materials.

12. A print control method according to claim 11, further comprising converting the color specifying information into mix specifying information for specifying a mix of the color material.

13. A storage medium readable by a machine tangible embodying a program of instructions executable by the machine to control a print of print target data containing color specifying information, said program comprising:

distinguishing between pieces of element data contained in the print target data; and color adjustment adjusting a mix of color materials by converting the color specifying information into a color mix specifying information that specifies the mix of color materials according to a category of the element data, wherein said color adjustment adjusting further adjusts the toner spent quantity in accordance with print resolution, wherein said color adjusting step further comprises adjusting a toner spent quantity dependent upon whether the element data is character data, graphic data, image data, draw target attributes which include character dimension, line width, and dot size and print resolution, and wherein said color adjustment adjusts a mix of color materials by converting the color specifying information into one of a plurality of color mix specifying information within a predetermined range of a color difference on the basis of a coloring value based on the color specifying information.

14. A storage medium readable by a machine, tangible embodying a program according to claim 13, further comprising converting the color specifying information into mix specifying information for specifying a mix of the color material, said color adjustment adjusting the mix specifying information according to the category of the element data.

15. A storage medium readable by a machine, tangible embodying a program according to claim 14, further comprising inputting save specifying information for saving the color materials when printing according to the category of the element data, said color adjustment saving the color materials when printing by adjusting the mix specifying information based on the save specifying information according to the category of the element data.

16. A storage medium readable by a machine, tangible embodying a program according to claim 13, further comprising categorizing the element data on the basis of dimension attributes, said color adjustment adjusting the mix specifying information in accordance with the dimension attributes.

17. A storage medium readable by a machine tangible embodying a program of instructions executable by the machine to control a print of print target data containing color specifying information, said program comprising:

inputting information on a color difference on the basis of a coloring value based on the color specifying information; and adjusting a mix of color materials on the basis of the color specifying information within a range of the color difference, and minimizing a consuming quantity of the color materials, wherein said color adjustment adjusting further adjusts the toner spent quantity in accordance with print resolution, wherein a plurality of tables containing different mixes of color materials within the range of the color difference are maintained which minimize different levels of consuming quantities of the color materials.

18. A storage medium readable by a machine, tangible embodying a program according to claim 17, further comprising converting the color specifying information into mix specifying information for specifying a mix of the color material.

* * * * *